(12) United States Patent
Truyen et al.

(10) Patent No.: US 8,570,323 B2
(45) Date of Patent: Oct. 29, 2013

(54) VOLUME VISUALIZATION USING TISSUE MIX

(75) Inventors: Roel Truyen, Eindhoven (NL); Iwo Willem Oscar Serlie, Delft (NL); Steven Lobregt, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 1265 days.

(21) Appl. No.: 10/545,655

(22) PCT Filed: Feb. 17, 2004

(86) PCT No.: PCT/IB2004/050117
§ 371 (c)(1),
(2), (4) Date: Aug. 15, 2005

(87) PCT Pub. No.: WO2004/075116
PCT Pub. Date: Sep. 2, 2004

(65) Prior Publication Data
US 2006/0143215 A1    Jun. 29, 2006

(30) Foreign Application Priority Data
Feb. 18, 2003   (EP) .................................... 03100373

(51) Int. Cl.
G06T 17/00 (2006.01)
G06T 15/00 (2011.01)
G06T 15/50 (2011.01)

(52) U.S. Cl.
USPC ........... 345/424; 345/420; 345/419; 345/426; 345/428

(58) Field of Classification Search
USPC .................. 600/425; 707/102; 345/424, 420; 382/128, 131
See application file for complete search history.

(56) References Cited

U.S. PATENT DOCUMENTS

| 5,068,788 | A |   | 11/1991 | Goodenough et al. |
| 5,381,518 | A | * | 1/1995 | Drebin et al. .................. 345/424 |
| 5,937,083 | A | * | 8/1999 | Ostuni .......................... 382/131 |

(Continued)

FOREIGN PATENT DOCUMENTS

| GB | 2190570 A | 11/1987 |
| JP | 63024478 A | 2/1988 |
| WO | 02067201 A1 | 8/2002 |
| WO | 02084594 A2 | 10/2002 |

OTHER PUBLICATIONS

Kniss, et al: Interactive Volume Rendering Using Multi-Dimensional Transfer Functions and Direct Manipulation Widgets, IEEE Visualization, Oct. 2001, pp. 255-262.*
D. C. Williamson, et al: Partial Volume Tissue Segmentation Using Grey-Level Gradient, Presented at MIUA on May 22, 2002.*

(Continued)

*Primary Examiner* — Ulka Chauhan
*Assistant Examiner* — Sae Won Yoon

(57) ABSTRACT

Disclosed is a method of constructing an object data set of data elements representing a physical property to be displayed, stored or written to a readable medium. The method includes, assigning, by the data elements, data values to respective positions in a multi-dimensional geometrical space, wherein the data values representing a physical property of an object; assigning attributes to respective data elements; deriving relative contributions of the physical property to the data values of the respective data elements; and assigning the attributes to the data elements on the basis of the relative contributions of the physical property to the data values of the data elements.

20 Claims, 3 Drawing Sheets

(56) References Cited

U.S. PATENT DOCUMENTS

| | | |
|---|---|---|
| 6,324,240 B1 | 11/2001 | Yan et al. |
| 6,573,893 B1 * | 6/2003 | Naqvi et al. .................. 345/424 |
| 7,194,117 B2 * | 3/2007 | Kaufman et al. ............. 382/128 |
| 7,231,075 B2 * | 6/2007 | Raghavan et al. ............ 382/128 |
| 2004/0171931 A1 * | 9/2004 | Barth et al. ................... 600/425 |
| 2006/0222219 A1 * | 10/2006 | Truyen et al. ................ 382/128 |

OTHER PUBLICATIONS

Oe Kniss, et al: Interactive Volume Rendering Using Multi-Dimensional Transfer Functions and Direct Manipulation Widgets, IEEE Visualization, Oct. 2001, pp. 255-262.

D. C. Williamson, et al: Partial Volume Tissue Segmentation Using Grey-Level Gradient, MIUA 2002.

* cited by examiner

VOLUME VISUALIZATION USING TISSUE MIX

The invention relates to a method of constructing an object data set, the object data set containing data elements, the data elements assigning data values to respective positions in a multi-dimensional geometrical space, the data values representing a physical property of an object, wherein the construction of the object data set includes assigning attributes to respective data elements.

"Interactive Volume Rendering Using Multi-Dimensional Transfer Functions and Direct Manipulation Widgets" by Jo Kniss, Gordon Kindlmann and Charles Hansen, Proceedings of IEEE Visualization, Pages 255-262, San Diego, Calif., USA, October 2001, IEEE Computer Society, discloses a problem facing volume rendering techniques. This is the problem of how to differentiate between visual features, which because of their similarities, cannot be differentiated using current methods. The paper explains that this may be solved by the use of multi-dimensional transfer functions and describes how these may be manipulated and selected by the user. The paper gives an example of how to assign derivable attributes of an image to these multi-dimensional transfer functions, but these still do not provide adequate volume rendering to all images. In particular, it does not offer an adequate solution to the problem of partial volume effect.

It is therefore an object of the invention to provide a way of assigning derivable attributes to an image in a manner which allows a more representative volume rendering of a subject.

The is achieved according to the method of the invention whereby relative contributions of the physical property to the data values of the respective data elements are derived and the attributes to the data elements are assigned on the basis of the relative contributions of the physical property to the data values of the data elements.

Current methods of volume rendering used in medical image processing typically produce a 2 dimensional projection image from a 3 dimensional array of volume elements which represents a subject in a part of real 3 dimensional space, or which can be computer generated, for example, as virtual 3 dimensional space. In the case of the subject situated in real 3 dimensional space, each voxel in the 3 dimensional array of volume elements, otherwise know as a 3 dimensional object data set, or just object data set, contains a value representing a measured distribution of a property in this 3D space. In medical imaging this measured distribution of a property is measured by, and forms the output of, an imaging apparatus and is dependent on the manner in which the imaging apparatus physically works. An x-ray computed tomography machine, CT machine, for example, measures the distribution of energy in an x-ray beam which has irradiated a patient and the physical property which forms the basis of the output is the attenuation of x-radiation caused by the relative densities of tissue within the body of the patient. A 3 dimensional object data set produced by a CT machine is therefore really a 3 dimensional image volume of relative densities, within the subject, to radiation.

An similar statement can be made about the contents of a computer generated 3 dimensional virtual space. So in this case, the array of possible values can be calculated or estimated or in some other way synthetically produced.

Digital medical images, as an output from an imager, or synthetically produced, are rendered in a digital range of grey scale intensities. In the case of the image volume set produced by the CT machine, the range of grey scale intensities represents the range of relative densities to radiation presented by the tissue within the imaged subject.

These relative densities are perceived by the eye of the viewer in groups of like visual value. The groups of like value represent different sub structures within the body which have different physical properties. So for example, all the volume elements representing bone will be perceived as being separate from surrounding volume elements which do not represent bone, because the bone has certain physical properties which grant it a certain density to radiation. In other words, the method of the imager allows different tissues and structures within the body to be seen and differentiated.

Various methods have been developed to present these images to the user in a way which incorporates both intelligibility with accuracy of content. One such method is volume rendering, which attempts to present structural information, held within the full volume of information, in an image in which overlying structural information is either fully transparent or at least only partially opaque.

The data held in a 3 dimensional object data set is held as an array of data points, or voxels. One common step in rendering the contents of this 3 dimensional array of voxels is to assign an opacity value and color value to each voxel in relation to its grey value. This opacity and color represent the optical properties as chosen for visualization of a particular tissue. The 2 dimensional projection image which is then made from this 3 dimensional object data set contains a 2 dimensional array of pixels, or picture elements, containing enough color and opacity values to allow the eye of the viewer to perceive a 3 dimensional object which appears solid.

Generally, the procedure for producing this 2 dimensional projection image is as follows. For each pixel of the 2 dimensional projection image, a ray is cast through the voxel space of the 3 dimensional object data set. The opacity and color values are determined at locations along the rays and then combined to obtain one opacity and color value for each ray. This combination can be done in a number of different ways depending on the desired type of rendering, for example calculating the minimum or maximum along the ray, apply alpha-blending of colors and opacities or calculation of an iso-value. These methods are known to those skilled in the art.

Currently, the mapping between voxel values to opacities and colors is done by using a 1-dimensional lookup table, LUT. This allows opacity and color to be read off against the grey value of an individual voxel. However, opacity and color are two separate variables and can not be accommodated easily within a single 1 dimensional look-up table. In particular in medical applications, where the goal is to visualize different anatomical structures or tissues with different colors and different opacities, this inherently assumes that the value of a voxel is characteristic for the tissue at the 3D location which is represented by the voxel. This is simply not true. A particular problem which occurs in the field of medical imaging is that of partial volume effect.

The partial volume effect is the existence, within a single voxel, of contributions from more than one range of values of a physical property. In other words, it is the existence, within a single voxel, of more than one tissue, or, put another way, the voxel represents a space containing more than one tissue. The partial volume effect is prone to occur in 3 dimensional object data sets in the parts of the data set that represent boundaries between tissues or boundaries between tissue and air. In this case there is a large likelihood that voxels will occur which contain a value that represents a mixture of values representing the different tissues or representing both tissue and air. Similar statements can be made voxels which describe portions of an object which contain any other sort of boundary, for example a boundary between tissue and a prosthesis, or between tissue and a contrast fluid, or between tissue and bodily fluid.

A serious shortcoming of the present techniques using the ID mapping from voxel values to opacity or color, is that it is assumed that only mixtures between tissues of relatively similar grey value occur. However, due to the partial volume effect, this may in reality not be the case. It is perfectly possible that a tissue mixture of contrast and air straddles a voxel, and the grey value rendered in that voxel will be an average value between the two extreme values used to render air and to render contrast agent. This average is frequently seen to be in the normal range of grey values used to render tissue. This value therefore provides inaccurate information because the viewer sees a voxels which looks as though it contains tissue, when in fact it contains air and contrast. The value does not give sufficient information to decide whether this voxel represents a pure tissue, or a mixture of other tissues. Mapping the voxel values through a 1 dimensional look up table into tissue related opacity and color will therefore lead to erroneous an inaccurate visualization results.

This problem is solved according to the method of the invention by which more information, instead of just intensity grey value, is mapped into color and opacity. It will be appreciated by the person skilled in the art that the invention can be applied to more attributes than just color and opacity. For example, the invention could be used to map also to method of shading or to size of image label, and the person skilled in the art will appreciate that there are other possibilities.

Using more information to perform the map between voxel and attribute, that is to say, to start with a voxel and to map a specific color and opacity value to it, we are in effect using look up tables of dimension greater than one. That is to say, these look up tables are not defined in the 1 dimensional space of the voxel grey values, but in a higher dimensional space describing the number of information values we are using to perform the mapping. The extra information we use is provided by tissue mixtures.

Tissue mix can be thought of as the contribution to each voxel of each particular type of tissue. It is particularly useful when considering voxels which manifest partial volume effect. A voxel which straddles an air tissue boundary and contains a single grey value which is an average of the relative amounts of air and tissue, may, for example contain a tissue mix of 40% air and 60% tissue, say. On the other hand it may contain 50% air and 50% tissue, or may instead represent a different type of tissue with a darker grey value. Although the original imaging process in effect loses information about the original subject of investigation by reducing the information content to, for example, a digitized 3 dimensional array of voxels, there is sometimes sufficient information within the array to calculate these mixtures and utilize this extra information.

A calculation of tissue mixtures can be represented by a series of probabilities, $(p_1, p_2, \ldots p_N)$, where $p_1$ is the probability that a certain tissue contributes to the voxel in question. Such probability values can be calculated for each and any voxels in an array, to any number of probabilities, depending on how complex the tissue model is, that is to say, on how many tissues it is considered contribute to each voxel.

It is the probability values for each voxel which are mapped to color and opacity. The person skilled in the art will realize that any other distribution or mathematical representation of tissue mix can also be mapped onto color, opacity or indeed any other attribute.

In other words, we map the color and opacity values using a dimensional space defined on tissue mixtures. A mixture of N tissues can be represented in an N−1 dimensional space, so 3 tissues can be represented in a triangle in 2 dimensions, 4 tissues in a tetraeder in 3 dimensions, and so forth.

Defining opacity functions on tissue mixtures allows us to have a more accurate classification of voxels containing a tissue mixture due to the point-spread-function and discrete nature of the acquisition and rendering process. This improved classification in turn leads to more accurate and useful visualization results. It further allows for additional functionality like the switching on and off of tissues, and reduction of noise.

These an other features of the invention will be explained using the following diagrams.

Figure 1:
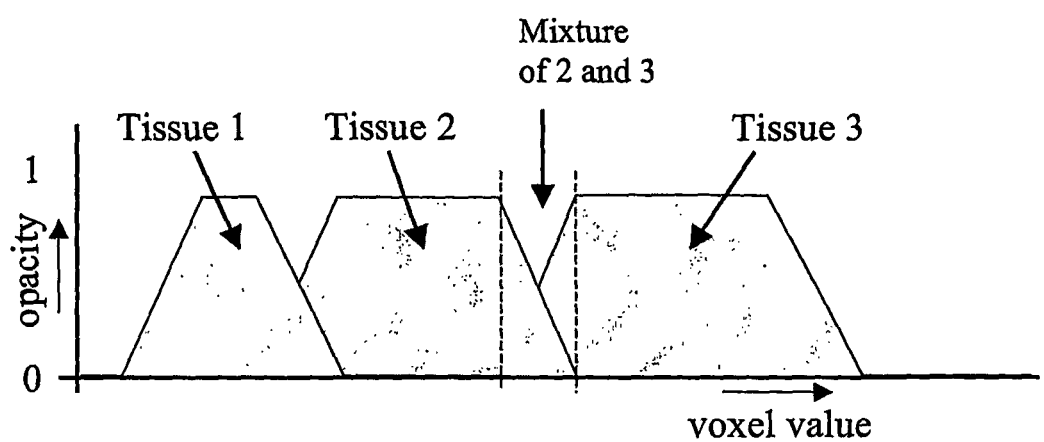
FIG. 1 shows the classification of voxels into 3 tissues and demonstrates how misclassification can lead to errors, which are alleviated by the invention.

FIG. 1 is a representation of a typical 1 dimensional look up table used to assign color and opacity to voxels. The intensity grey value is mapped along the horizontal axis and opacity is mapped along the vertical axis. Different tissues are represented by different ranges of voxel grey value and in order to render these usefully in a volume rendered image, are usually assigned different colors, as is apparent from inspection of the figure. Each of the individual plots of color is a separate transfer function, as is known to those who are skilled in the art. Part of the skill in volume rendering is in producing transfer functions which are capable of rendering different tissues so that they appear visually distinct and then in selecting the correct transfer function for each intended volume visualization. However, further analysis of the figure reveals the following problem with transfer functions ascribed to 1 dimensional look up tables. A voxel representing the tissue designated as tissue 2 will have a voxel intensity value in the middle of the range of intensity values. A further voxel, however, whose intensity value is the result of contributions from tissues 1 and 3, will also have an intensity value in the middle of the range. The viewer will be unable to differentiate between the two cases.

Figure 2:
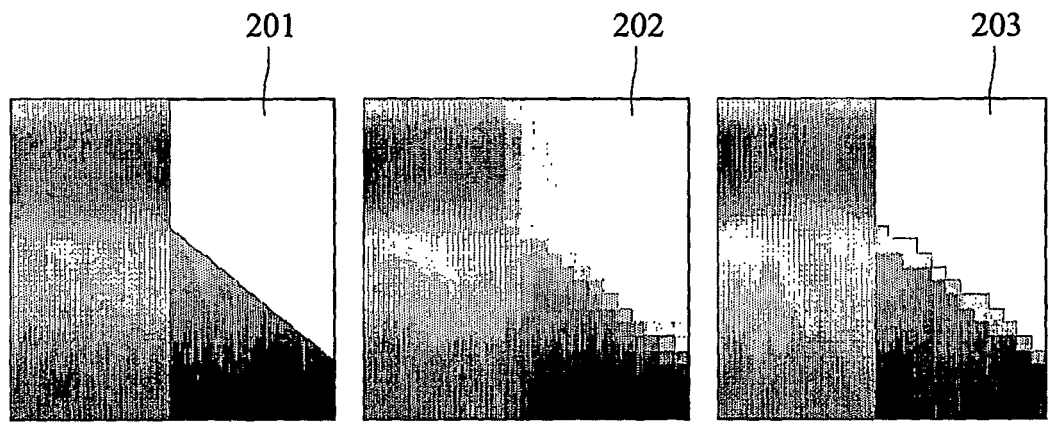
FIG. 2 is a graphical representation of the problem of partial volume effect, which is alleviated by the method of the invention.

FIG. 2 is a graphical representation of the problem of partial volume effect using 2 dimensional images. The first image, 201, shows an idealized 3 tissue mix in an image. The second image, 202, shows the partial volume effect at tissue boundaries due to point-spread-function and sampling. The third image, 203, shows the erroneous classification of pixels which occurs when using only a 1 dimensional look up table. It can be seen from 203 that there is no visual difference between the grey tissue on the left hand side of the image and the line of pixels of like-intensity between the dark and light areas on the right hand side of the image.

Figure 3:
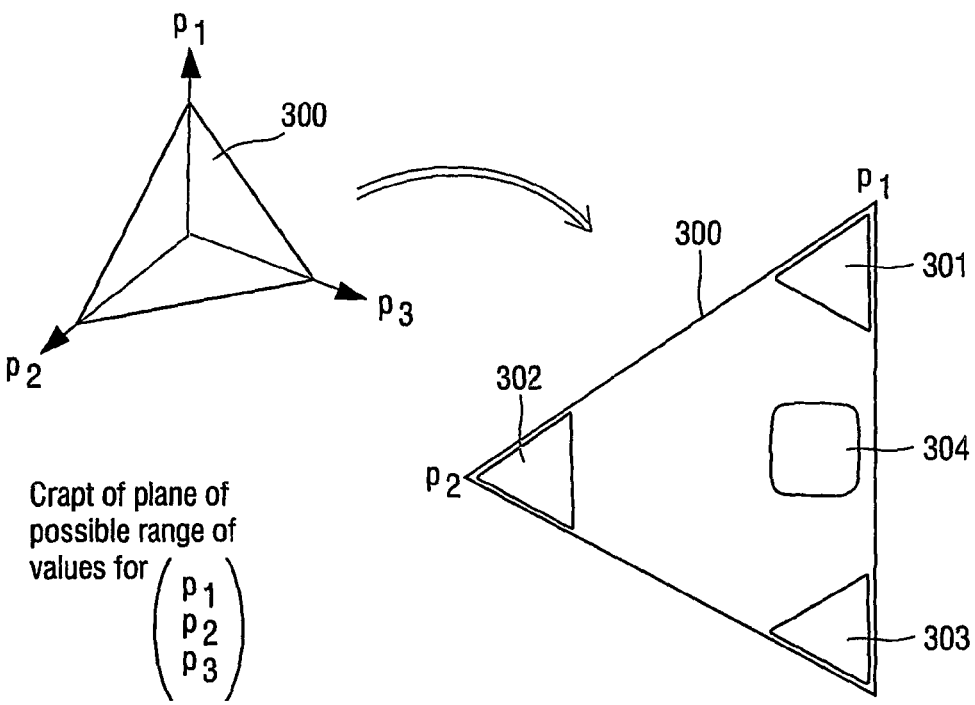
FIG. 3 is a graphical representation of the invention and explains how the mapping of tissue mix allows voxels which represent a single tissue type to be differentiated from voxels whose intensity value is a result of the partial volume effect.

FIG. 3 is a graphical representation of the invention. For any voxel in a three tissue system, we can describe the probability of tissue types 1, 2 and 3 contributing to that voxel as $(p_1, p_2, p_3)$. This can be extended to a more complicated system consisting of N tissues, $(p_1, p_2, p_3, \ldots, p_N)$, or be reduced to a more simple system consisting of only 2 separate tissue types, $(p_1, p_2)$. Given the anatomical complexity shown within most medical images, the 2 or 3 tissue systems are particularly useful when considering localized areas within an overall image, for example, areas where 2 or 3 tissue types meet and form boundaries. It will be appreciated by those skilled in the art that the 3 tissue system forms a particularly useful example with which to describe the overall invention.

The sum of all the probability values is 1. In the case of 3 tissue types, if these values are plotted out on a graph, the range of possible points in the graph form a plane, 300, within 3 dimensional space. This plane is shown coplanar with the page for clarity.

This plane forms the basis of the new, multi-dimensional look up table onto which a new, multi-dimensional transfer function can be applied. The relative probabilities of the contributions of the, in this case three, different tissue types are plotted out on the table to form a point. This is now the new point from which the value of a multi-dimensional transfer function can be read off.

This is further shown in FIG. 3. Voxels representing tissue 1, for example, will be plotted in the corner of the plane, 301, which represent high probability values for tissue 1, and correspondingly low probability values for tissues 2 and 3. Similar statements can be made for both tissue 2, whose voxels are plotted mainly in the region 302, and tissue 3, whose voxels are plotted mainly in the region 303. Any of tissues 1, 2 or 3 could represent real tissue or, for example, air, fluid, contrast or foreign object, as will be appreciated by those skilled in the art.

It is at this point that the power of the invention becomes apparent. Any voxels whose value is a result of the partial volume effect will, because of the calculation of the tissue mix in that voxel, no longer be plotted in the same part of the look up table as tissues whose voxel value is similar to the value produced by the partial volume effect. For example, if tissue 1 is air, tissue 2 is soft tissue and tissue 3 is contrast enhanced fluid, then voxels lying on the boundary between air and the contrast enhanced fluid, that is between tissue 1 and tissue 3 will be plotted in region 304, along the edge of the look up table, and will no longer be plotted in region 302. Comparison with the situation in FIG. 1 will show that this fact produces a fundamental leap forward in the differentiation of voxels within an image.

Transfer functions can now be defined on the higher dimensional look up table space which will differentiate between the various tissues and take the partial volume effect into account.

Figure 4:
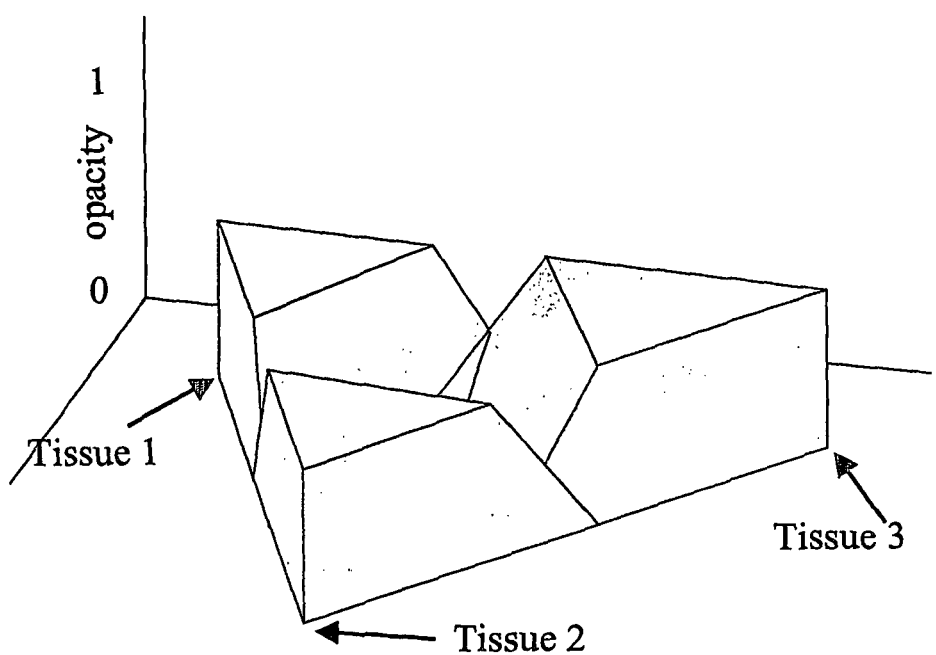
FIG. 4 shows a transfer function defined on a 2 dimensional look up table which can be used to map voxels to new values of color and opacity, according to the invention.

FIG. 4 gives an example of just such a set of transfer functions. These ascribe different colors and opacities to 3 different tissues, 1, 2 and 3, and in doing so allocate all voxels which are hampered by the partial volume effect into one of the tissues which contribute to that voxel, and not into the tissue represented by the average intensity value of the tissues which contribute to that voxel.

It can therefore be seen that the invention provides a very powerful new way of allocating attributes to voxels in an object data set. Using the method of the invention to aid volume visualization, the relative contributions of the physical property described by the object data set are themselves calculated, or derived, and used to assign data values, or attributes, to those data values. In other words, each voxel in the object data set contains the intensity grey value needed to describe the particular combination of the physical property, utilized by the imaging modality, in the space represented by the voxel, and the relative contributions of that combination of physical property are used to assign attributes to the voxel.

This is a very powerful way of using the data contained within an object data set and the invention can be applied to various problems within medical imaging, including, as above, the selective visualization of tissues.

In a double contrast colon study, for example, both air and contrast material is present in the colon and produces partial volume effects between air and tissue, air and contrast and between tissue and contrast. It is usually the intention in the study to visualize the air-wall (black-grey) and contrast-wall (white-grey) boundaries, and not the air-contrast (black-white) boundary. This is not possible using grey value information alone, for example using iso-surface rendering, since the grey value cannot distinguish between the 3 tissue transitions, as described above. However, if the tissue mixtures are known, transfer functions can be defined to visualize only the wall and air and contrast can be switched off.

A further example of how this invention can be used in practice is in the handling of noise in images. Using the method of the invention we can model the noise as tissue, and make more noise robust renderings by switching off the voxels with a high noise mixture content. In other words, we can make the noise transparent.

The calculation of tissue mix is fundamental to the method of the invention. Tissue mix is known in the art, for example from "Partial Volume Tissue Segmentation using Grey-Level Gradient", D. C. Williamson, N. A. Thacker, S. R. Williams and M. Pokric, presented at MIUA 2002, which discloses a method for its calculation. Unfortunately, this method is not very robust to noise.

An improved method is presented for the calculation of tissue mix. we calculate the different tissue contributions in a single voxel by adding more measurements to the data volume. These measurements include the grey value gradient magnitude in a voxel and in a neighborhood around the voxel, the average grey value in a number of neighborhoods around the voxel, each with a different size (multiscale approach), and fitting the various values of grey value and gradient measured to a model of the expected behavior for certain types of tissue transitions, and using the optimal model and goodness-of-fit as measures.

This can be further explained using, as example, a 3 tissue type partition offering a range of intensity values from high intensity to low intensity. For ease of clarity, the three tissue types chosen are air, soft tissue and contrast enhanced stool. As is known to those skilled in the art, all methods of calculating tissue mix start with some sort of assumption about the information in the object data set. Our assumption is that an edge, or boundary between two tissue types looks like a Gaussian smoothed step edge between 2 materials each with constant grey value.

For a tissue transition, a model is made of how the grey values and grey value derivatives, known to those skilled in the art as the gradient magnitude, vary when crossing an edge in the direction of the gradient. This is done by sampling both the grey value and gradient value along the direction of the maximum gradient and plotting these to produce a graph of grey value-gradient magnitude relation. This model gives us an expected behavior of the measurements near the different transitions, and will be a great help in robustly determining any transition in a voxel between one tissue type and another. Such plots can be made for all tissue transitions in an image.

In a 3 tissue type partition there are 3 different transitions possible between any 2 of the 3 different tissue types. These are the boundary between tissue types 1 and 2, the boundary between tissues types 2 and 3 and the boundary between tissue types 1 and 3. The grey values are sampled along the gradient direction across the boundaries in the image, this gradient direction being orthogonal to the separating surface. It will be clear to those skilled in the art that more sophisticated assumptions will lead to more complex models, but do not modify the general idea of this method of calculating tissue mix. The method can further be generalized to junctions between 3 tissues, or transitions between more than 3 tissues.

Using the model as described above we can now classify any voxel as belonging to one of the 3 transitions. For every voxel in the image, we determine the direction of the gradient and sample the grey values and gradient magnitudes along that direction. We determine the parameters of the model that best corresponds to the samples near the voxel and in doing so are able to place any voxel, and the voxels around it, on the correct portion of our grey value-gradient magnitude relation plots for the different tissue type boundaries.

Yet again, this allows us to separate out the voxels according to the particular tissue mix within that voxel.

Using a model of the transition gives us a high robustness to disturbing influences. In addition we need only sample in the immediate neighborhood of the voxel. It is not necessary to sample until we reach the homogenous tissue area. This provides us with exceptional advantages. Other methods of calculating tissue mix known in the art rely on different sampling techniques which, in effect, cast their net too wide and draw in voxels from areas in the image which are not immediately adjacent the tissue boundary. This has the disadvantage that those outlying voxels can include intensity grey values from tissue types which do not contribute to the original voxel being tested.

The best fitting model gives us information on which type of transition the original voxel was located, or instead, if it was located within uniform tissue. The exact position of the voxel point on the model curve of grey value and gradient magnitude allows us not only to identify which 2 tissues, in this case, contribute to the voxel, but also what those relative contributions are.

It will be apparent to those skilled in the art that this method, described here in terms of 3 tissues, can be applied to any number of tissue types depending on how complex the application is.

This method of calculation tissue mix can be applied to segmentation, quantification and visualization where high accuracy is required. Examples of its use include visualization. For example, in a double contrast colon study (air and contrast material is present in the colon), we want to visualize the air-tissue and contrast-tissue boundaries. This is not possible using grey value information alone (e.g. iso-surface rendering), since the grey value cannot distinguish between the 3 tissue transitions. We need to know the tissue mixtures to be able to visualize only the desired transitions. Also, in quantification of lung nodules and tumors, often a threshold-based method is used to distinguish between lesion and non-lesion voxels, and the lesion voxels are counted to determine the volume. The accuracy can be improved by using tissue mixture information, because the voxels near the interface lesion-surrounding will also partially belong to the lesion. This can make a significant difference in small lesions. Further, in segmentation, using mixture densities allows us to use simple techniques like thresholding to achieve sub-voxel accuracies in the segmentation. The result of a segmentation is no longer a binary volume (as is the case with simple thresholding on grey values), but a more fuzzy volume where every voxel contains a value between 0 and 1 representing its tissue density. A pure binary volume (only values 0 and 1 occur) is a special case of this fuzzy volume.

This is a novel method of calculating tissue mix which can be used independently of the application to volume visualization.

The invention claimed is:

1. A method comprising:
   receiving a data set that includes a plurality of voxels, each voxel corresponding to a location within a volume, each voxel including a measure of a physical property at the location of the voxel,
   defining a plurality of tissue types or tissue mix,
   determining a likelihood of each tissue type or tissue mix contributing to the measure at each voxel, the likelihood of each tissue type forming a plurality of likelihoods associated with each voxel,
   determining a classification of each voxel based on the associated plurality of likelihoods, and
   providing a display based on the classification of select voxels;
   wherein determining the likelihood includes:
      determining a first gradient magnitude at the voxel,
      determining an average measure and a second gradient magnitude in a neighborhood around the voxel, and
      fitting the measure, average measure, first gradient, and second gradient to a model of expected behavior for select tissue transitions to provide a best-fit estimate of the likelihood of the select tissue transition.

2. The method of claim 1, wherein the display corresponds to a two-dimensional display of pixels based on the classification of the select voxels, the select voxels corresponding to voxels along a projected ray from each pixel location.

3. The method of claim 2, including associating a display characteristic to each classification, and the display at each pixel includes a composite of the display characteristics of the voxels along the projected ray.

4. The method of claim 3, wherein the display characteristic includes an opacity of each classification.

5. The method of claim 4, wherein the opacity of one or more of the classifications is transparent, so that the composite of the display characteristics of the voxels along the projected ray is unaffected by the one or more classifications having transparent opacity.

6. The method of claim 5, wherein the one or more classifications includes a class that corresponds to a noise measure at the voxel.

7. The method of claim 1, wherein the classification includes a class that corresponds to a noise measure at the voxel.

8. The method of claim 1, wherein the first and second gradient magnitudes are determined along a direction of maximum gradient.

9. The method of claim 1, wherein the measure is provided by an X-ray computed tomography machine, and the physical property corresponds to density of radiation.

10. A non-transitory computer-readable medium that includes a program that, when executed by a processor, causes the processor to:
   receive a data set that includes a plurality of voxels, each voxel corresponding to a location within a volume, each voxel including a measure of a physical property at the location of the voxel,
   determine a likelihood of each tissue type or tissue mix of a plurality of tissue types or tissue mix contributing to the measure at each voxel, the likelihood of each tissue type forming a plurality of likelihoods associated with each voxel,
   determine a classification of each voxel based on the associated plurality of likelihoods, and
   provide a display based on the classification of select voxels;

wherein determining the likelihood includes:
   determining a first gradient magnitude at the voxel,
   determining an average measure and a second gradient magnitude in a neighborhood around the voxel, and
   fitting the measure, average measure, first gradient, and second gradient to a model of expected behavior for select tissue transitions to provide a best-lit estimate of the likelihood of the select tissue transition.

11. A method of mapping voxel values to object elements by a classification machine, comprising:
   identifying a plurality of object elements,
   creating a plurality of models of transitions between pairs of object elements, defining how parameters of each model change when crossing an edge between the object elements of each pair,
   receiving a set of voxel values corresponding to a set of measurements of a physical property at locations in a volume of space,
   determining a set of gradient values corresponding to changes of voxel values between adjacent locations,
   for each location:
      classifying the location as corresponding to a mix of a particular pair of object elements if the voxel values and gradient values in a vicinity of the location correspond to the parameters of the model of transitions between the particular pair of object elements; and
      classifying the location as corresponding to a single object element based on the voxel values and gradient values if the voxel values and gradient values do not correspond to the parameters of any of the plurality of models of transitions; and
   providing a representation of the classification of each location.

12. The method of claim 11, wherein:
   the plurality of models include models of transitions at junctions of more than two object elements, and
   the method includes classifying the location as corresponding to a mix of the more than two object elements if the voxel values and gradient values in a vicinity of the location correspond to the parameters of the model of transitions at the junction of these more than two object elements.

13. The method of claim 11, wherein the set of voxel values corresponds to a set of radiation densities provided by an X-ray computed tomography machine.

14. The method of claim 11, wherein the gradient values are determined along a direction of maximum gradient.

15. The method of claim 11, wherein the representation includes an opacity associated with each classification.

16. The method of claim 15, wherein the opacity of one or more of the classifications is transparent.

17. The method of claim 11, wherein the object elements include a plurality of tissue types.

18. The method of claim 17, wherein one of the object elements includes a noise element.

19. A non-transitory computer-readable medium that includes a program that, when executed by a processor, causes the processor to:
   receive a plurality of models of transitions between pairs of object elements of a plurality of object elements, defining how parameters of each model change when crossing an edge between the object elements of each pair,
   receive a set of voxel values corresponding to a set of measurements of a physical property at locations in a volume of space,
   determine a set of gradient values corresponding to changes of voxel values between adjacent locations,
   for each location:
      classify the location as corresponding to a mix of a particular pair of object elements if the voxel values and gradient values in a vicinity of the location correspond to the parameters of the model of transitions between the particular pair of object elements; and
      classify the location as corresponding to a single object element based on the voxel values and gradient values if the voxel values and gradient values do not correspond to the parameters of any of the plurality of models of transitions; and
   provide a representation of the classification of each location.

20. The medium of claim 19, wherein the plurality of models include models of transitions at junctions of more than two object elements, and the program causes the processor to classify the location as corresponding to a mix of the more than two object elements if the voxel values and gradient values in a vicinity of the location correspond to the parameters of the model of transitions at the junction of these more than two object elements.

* * * * *